US012663326B2

(12) United States Patent
Tanaami et al.

(10) Patent No.: US 12,663,326 B2
(45) Date of Patent: Jun. 23, 2026

(54) METHOD FOR MANUFACTURING FORCE SENSOR

(71) Applicants: SINTOKOGIO, LTD., Nagoya (JP); TOHOKU UNIVERSITY, Sendai (JP)

(72) Inventors: Yoshikane Tanaami, Nagoya (JP); Miyuki Hayashi, Nagoya (JP); Yoshiaki Kanamori, Sendai (JP); Taiyu Okatani, Sendai (JP)

(73) Assignees: SINTOKOGIO, LTD., Nagoya (JP); TOHOKU UNIVERSITY, Sendai (JP)

( * ) Notice: Subject to any disclaimer, the term of this patent is extended or adjusted under 35 U.S.C. 154(b) by 557 days.

(21) Appl. No.: 18/112,043

(22) Filed: Feb. 21, 2023

(65) Prior Publication Data

US 2023/0266188 A1     Aug. 24, 2023

(30) Foreign Application Priority Data

Feb. 24, 2022     (JP) ................................ 2022-027043

(51) Int. Cl.
*G01L 5/10* (2020.01)
*B32B 15/04* (2006.01)
*G01L 1/00* (2006.01)
(52) U.S. Cl.
CPC ................ *G01L 5/10* (2013.01); *B32B 15/04* (2013.01); *G01L 1/005* (2013.01)
(58) Field of Classification Search
CPC ... G01L 5/10; G01L 1/005; G01L 1/16; G01L 1/26; G01L 1/24; B32B 15/04; B23P 15/00
See application file for complete search history.

(56) References Cited

U.S. PATENT DOCUMENTS 2,752,558 A     6/1956  Kane
3,858,097 A  *  12/1974  Polye ........................ H01G 4/04
361/283.1

(Continued)

FOREIGN PATENT DOCUMENTS

DE          3137219 A1  *  4/1983
DE          41 03 706 A1     1/1992

(Continued)

OTHER PUBLICATIONS

U.S. Office Action issued Apr. 7, 2025 in U.S. Appl. No. 18/179,547.

(Continued)

*Primary Examiner* — Octavia Hollington
(74) *Attorney, Agent, or Firm* — Faegre Drinker Biddle & Reath LLP

(57) ABSTRACT

Provided is a method for manufacturing a force sensor including: preparing a first substrate which is made of a material that transmits electromagnetic waves and includes on its surface a metal array arranged in a periodic pattern and a second substrate which includes on its surface a metal layer that reflects electromagnetic waves; forming a spacer member on the surface of the first substrate; forming a first metal layer around the spacer member on the surface of the first substrate; forming a second metal layer in a region corresponding to the first metal layer on the second substrate; and fusing the first metal layer and the second metal layer together to fix the first substrate and the second substrate in a state in which the spacer member formed on the surface of the first substrate abuts the surface of the second substrate.

9 Claims, 5 Drawing Sheets

(56)                    References Cited

U.S. PATENT DOCUMENTS

| | | | | | |
|---|---|---|---|---|---|
| 4,177,496 A | * | 12/1979 | Bell | ...................... | G01L 9/0086 |
| | | | | | 361/283.4 |
| 4,287,553 A | * | 9/1981 | Braunlich | ............ | G01D 5/2417 |
| | | | | | 361/283.4 |
| 4,388,668 A | * | 6/1983 | Bell | ...................... | G01L 9/0075 |
| | | | | | 361/283.4 |
| 4,426,673 A | * | 1/1984 | Bell | ...................... | G01L 9/0086 |
| | | | | | 361/283.4 |
| 5,005,421 A | * | 4/1991 | Hegner | ................. | G01L 9/0075 |
| | | | | | 361/283.4 |
| 5,199,303 A | | 4/1993 | Benedikt et al. | | |
| 5,249,468 A | | 10/1993 | Benedikt et al. | | |
| 5,483,994 A | | 1/1996 | Maurer | | |
| 5,485,304 A | | 1/1996 | Kaeriyama | | |
| 5,503,023 A | | 4/1996 | Benedikt et al. | | |
| 5,703,282 A | | 12/1997 | Kuesell et al. | | |
| 7,698,952 B2 | * | 4/2010 | Renken | ................. | G01L 9/0073 |
| | | | | | 73/780 |
| 9,534,972 B2 | | 1/2017 | Eichhorn et al. | | |
| 9,825,557 B2 | * | 11/2017 | Wang | ...................... | H02N 1/04 |
| 2016/0280534 A1 | | 9/2016 | Stahl et al. | | |
| 2016/0349128 A1 | | 12/2016 | Kaufmann et al. | | |
| 2020/0158557 A1 | | 5/2020 | Le Floc'h | | |
| 2023/0266182 A1 | * | 8/2023 | Tanaami | ................... | G01L 1/24 |
| | | | | | 73/862.626 |

FOREIGN PATENT DOCUMENTS

| | | | |
|---|---|---|---|
| JP | | H08-62518 A | 3/1996 |
| JP | | 2007-057455 A | 3/2007 |
| JP | | 2010-151614 A | 7/2010 |
| JP | | 2020-094973 A | 6/2020 |
| JP | | 2020-131638 A | 8/2020 |

OTHER PUBLICATIONS

Japanese Office Action issued Sep. 30, 2025, in Application No. 2022-027043.

* cited by examiner 11        30        31

METHOD FOR MANUFACTURING FORCE SENSOR

CROSS-REFERENCE TO RELATED APPLICATION

This application is based on Japanese Patent Application No. 2022-027043 filed with Japan Patent Office on Feb. 24, 2022, the entire contents of which are hereby incorporated by reference.

TECHNICAL FIELD

The present disclosure relates to a method for manufacturing a force sensor.

BACKGROUND

Patent Japanese Unexamined Patent Publication No. 2020-94973 discloses a method for manufacturing a displacement sensor having an air gap structure in which a gap between a metal array and a thin metal film can be changed by an external force. This manufacturing method includes forming the metal array on a first substrate, forming the thin metal film and a spacer member on a second substrate, and overlapping the first substrate on the second substrate to fix the first substrate and the second substrate with a polyimide tape.

SUMMARY

Applying loads to a force sensor in a plurality of directions can be considered. Since the fixation with the polyimide tape as in the manufacturing method described in Japanese Unexamined Patent Publication No. 2020-94973 is a simple method used for prototyping, there is a risk of insufficient fixation. For this reason, the gap between the first substrate and the second substrate in an initial state with no load applied may change depending on use. The present disclosure provides a method for manufacturing a force sensor in which a positional relationship between a first substrate and a second substrate can be maintained to make a gap between the first substrate and the second substrate in an unloaded state constant.

A method for manufacturing a force sensor according to one aspect of the present disclosure includes the following (1) to (5):

(1) preparing a first substrate which is made of a material that transmits electromagnetic waves and includes on its surface a metal array arranged in a periodic pattern and a second substrate which includes on its surface a metal layer that reflects electromagnetic waves;

(2) forming a spacer member around the metal array on the surface of the first substrate;

(3) forming a first metal layer thinner than the spacer member around the spacer member on the surface of the first substrate;

(4) forming a second metal layer thinner than the spacer member in a region corresponding to the first metal layer on the second substrate; and (5) fusing the first metal layer and the second metal layer together to fix the first substrate and the second substrate in a state in which the spacer member formed on the surface of the first substrate abuts the surface of the second substrate.

In the method for manufacturing a force sensor, by fusing the first metal layer of the first substrate and the second metal layer of the second substrate together, the first substrate and the second substrate are fixed to each other in a state in which the spacer member of the first substrate abuts the surface of the second substrate. The first metal layer and the second metal layer are fused together, and thus the first substrate and the second substrate are more reliably fixed than when fixed with a polyimide tape. The spacer member of the first substrate abuts the surface of the second substrate, and thus a gap between the first substrate and the second substrate is kept constant even in a case in which thicknesses of the first metal layer and the second metal layer vary due to the fusion. Thus, according to the method for manufacturing a force sensor, a positional relationship between the first substrate and the second substrate can be maintained to make the gap between the first substrate and the second substrate constant when no load is applied.

A method for manufacturing a force sensor according to another aspect of the present disclosure includes the following (1) to (5):

(1) preparing a first substrate which is made of a material that transmits electromagnetic waves and includes on its surface a metal array arranged in a periodic pattern and a second substrate which includes on its surface a metal layer that reflects electromagnetic waves;

(2) forming a spacer member around the metal layer on the surface of the second substrate;

(3) forming a first metal layer thinner than the spacer member around the spacer member on the surface of the second substrate;

(4) forming a second metal layer thinner than the spacer member in a region corresponding to the first metal layer on the first substrate; and (5) fusing the first metal layer and the second metal layer together to fix the spacer member formed on the surface of the second substrate in a state in which it abuts the surface of the first substrate.

In the method for manufacturing a force sensor, by fusing the first metal layer of the first substrate and the second metal layer of the second substrate together, the first substrate and the second substrate are fixed to each other in a state in which the spacer member of the second substrate abuts the surface of the first substrate. The first metal layer and the second metal layer are fused together, and thus the first substrate and the second substrate are more reliably fixed than when fixed with a polyimide tape. The spacer member of the second substrate abuts the surface of the first substrate, and thus a gap between the first substrate and the second substrate is kept constant even in a case in which thicknesses of the first metal layer and the second metal layer vary due to the fusion. Thus, according to the method for manufacturing a force sensor, a positional relationship between the first substrate and the second substrate can be maintained to make the gap between the first substrate and the second substrate constant when no load is applied.

A method for manufacturing a force sensor according to still another aspect of the present disclosure includes the following (1) to (6):

(1) preparing a first substrate which is made of a material that transmits electromagnetic waves and includes on its surface a metal array arranged in a periodic pattern and a second substrate which includes on its surface a metal layer that reflects electromagnetic waves;

(2) forming a first spacer member around the metal array on the surface of the first substrate;

(3) forming a first metal layer around the first spacer member on the surface of the first substrate;

(4) forming a second spacer member in a region corresponding to the first spacer member and around the metal layer on the surface of the second substrate;

(5) forming a second metal layer on the surface of the second substrate in a region corresponding to the first metal layer and around the second spacer member; and (6) fusing the first metal layer and the second metal layer together to fix the first substrate and the second substrate in a state in which the first spacer member formed on the surface of the first substrate abuts the second spacer member formed on the surface of the second substrate.

In the method for manufacturing a force sensor, by fusing the first metal layer of the first substrate and the second metal layer of the second substrate together, the first substrate and the second substrate are fixed to each other in a state in which the first spacer member of the first substrate abuts the second spacer member of the second substrate. The first metal layer and the second metal layer are fused, and thus the first substrate and the second substrate are more reliably fixed than when fixed with a polyimide tape. The first spacer member of the first substrate abuts the second spacer member of the second substrate, and thus a gap between the first substrate and the second substrate is kept constant even in a case in which thicknesses of the first metal layer and the second metal layer vary due to the fusion. Thus, according to the method for manufacturing a force sensor, a positional relationship between the first substrate and the second substrate can be maintained to make the gap between the first substrate and the second substrate constant when no load is applied.

In one embodiment, the first metal layer and the second metal layer may be made of the same material. In this case, since the first metal layer and the second metal layer are made of the same material, the first metal layer and the second metal layer are strongly fused together. Thus, according to the method for manufacturing a force sensor, the first substrate and the second substrate can be more reliably fixed to each other.

According to the present disclosure, it is possible to manufacture a force sensor in which the positional relationship between the first substrate and the second substrate can be maintained to make the gap between the first substrate and the second substrate constant in the unloaded state.

DETAILED DESCRIPTION

Figure 1:
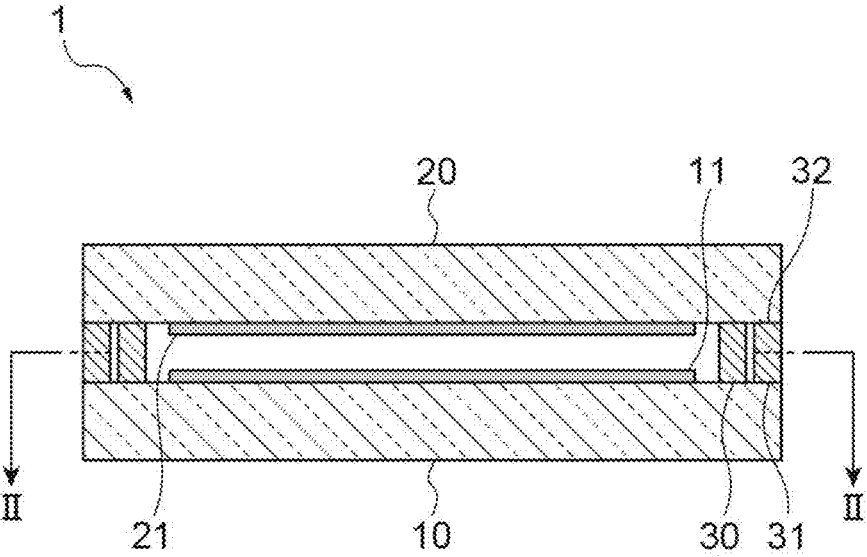
FIG. 1 is a cross-sectional view showing an example of a force sensor.

Embodiments of the present disclosure will be described below with reference to the drawings. Also, in the following description, the same or corresponding elements will be denoted by the same reference numerals, and repetitive description will not be repeated. Dimensional ratios in the drawings do not necessarily match those in the description.

[Force sensor] A force sensor manufactured by a manufacturing method according to the present embodiment is a force sensor using electromagnetic waves. Electromagnetic waves include visible light, infrared light, terahertz waves, or microwaves. The force sensor has an air gap structure in which a gap is formed between a metal array and a metal layer. Reflected waves are measured from incident waves which are electromagnetic waves entering the air gap structure. A resonant wavelength is obtained on the basis of the incident and reflected waves. The resonant wavelength changes with a size of the gap formed between the metal array and the metal layer. The gap formed between the metal array and the metal layer changes due to an external force. That is, the force sensor using electromagnetic waves is a sensor for measuring the external force on the basis of a change in the resonant wavelength.

Figure 2:
FIG. 2 is a cross-sectional view along line II-II in FIG. 1.
Figure 2:
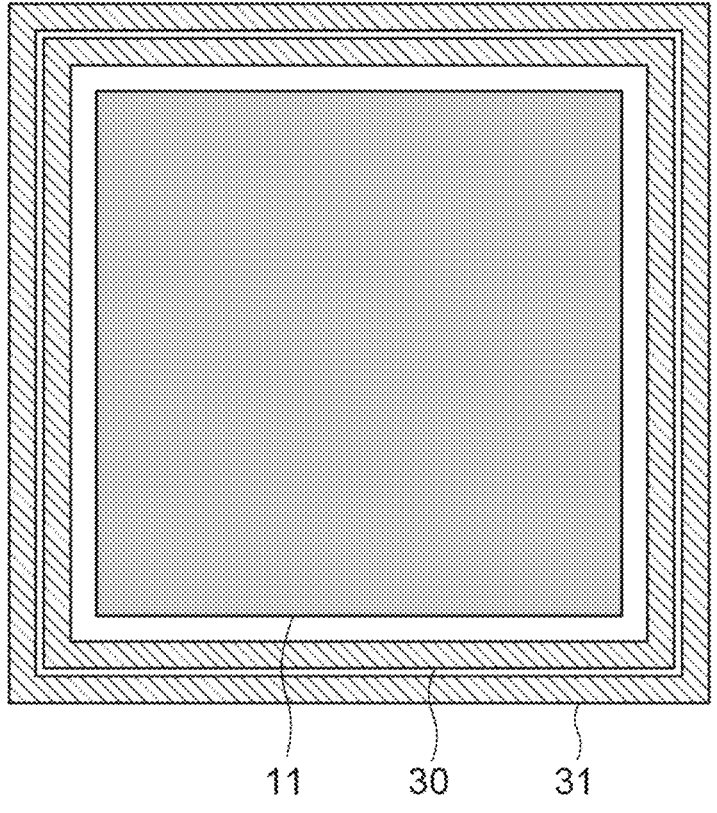

FIG. 1 is a cross-sectional view showing an example of a force sensor according to one embodiment. FIG. 2 is a cross-sectional view along line II-II in FIG. 1. As shown in FIG. 1, the force sensor 1 includes a lower substrate 10 and an upper substrate 20. The lower substrate 10 is an example of a first substrate. The upper substrate 20 is an example of a second substrate. The lower substrate 10 is made of a material that transmits light. Light is an example of electromagnetic waves. The lower substrate 10 is, for example, a glass substrate. The lower substrate 10 has a metal array 11 arranged in a periodic pattern on its upper surface. The upper surface is an example of a surface of the lower substrate 10. The metal array 11 is, for example, a rod array or dot array. The metal array 11 may be configured by a pattern in which substantially square arrays, of which a side is 350 nm, are periodically arranged at intervals of 400 nm. A material of the metal array 11 is, for example, gold (Au) or aluminum (Al). The upper substrate 20 does not have to be made of a material that transmits light and may be a glass substrate, a silicon substrate, or the like. The upper substrate 20 has a metal layer 21 that reflects light on its lower surface. The lower surface is an example of a surface of the upper substrate 20. A material of the metal layer 21 is Au or Al, for example. The lower substrate 10 and the upper substrate 20 may be made of quartz or alkali-free glass containing no alkali component.

As shown in FIGS. 1 and 2, the lower substrate 10 and the upper substrate 20 are fixed to each other with a gap therebetween by a spacer member 30 provided around the metal array 11 and the metal layer 21, a first metal layer 31, and a second metal layer 32. Thus, the gap is formed between the metal array 11 and the metal layer 21. The spacer member 30 is made of a metal that is less likely to oxidize and has a high melting point. The spacer member 30 has, for example, a three-layer structure of molybdenum (Mo)/Al/Mo. The spacer member 30 may be a single layer of Al, Mo, silver (Ag), titanium (Ti), or chromium (Cr).

Some light transmitted through the lower substrate 10 and the metal array 11 is reflected by the metal layer 21 and absorbed by resonating between the metal array 11 and the metal layer 21. A wavelength of the absorbed light is changed by the gap between the metal array 11 and the metal layer 21. The force sensor 1 is configured such that a posture of the upper substrate 20 relative to the lower substrate 10 is changed in accordance with a load from the outside. Accordingly, the load applied to the force sensor 1 is indicated by a change in wavelength of the light absorbed by force sensor 1.

Figure 3:
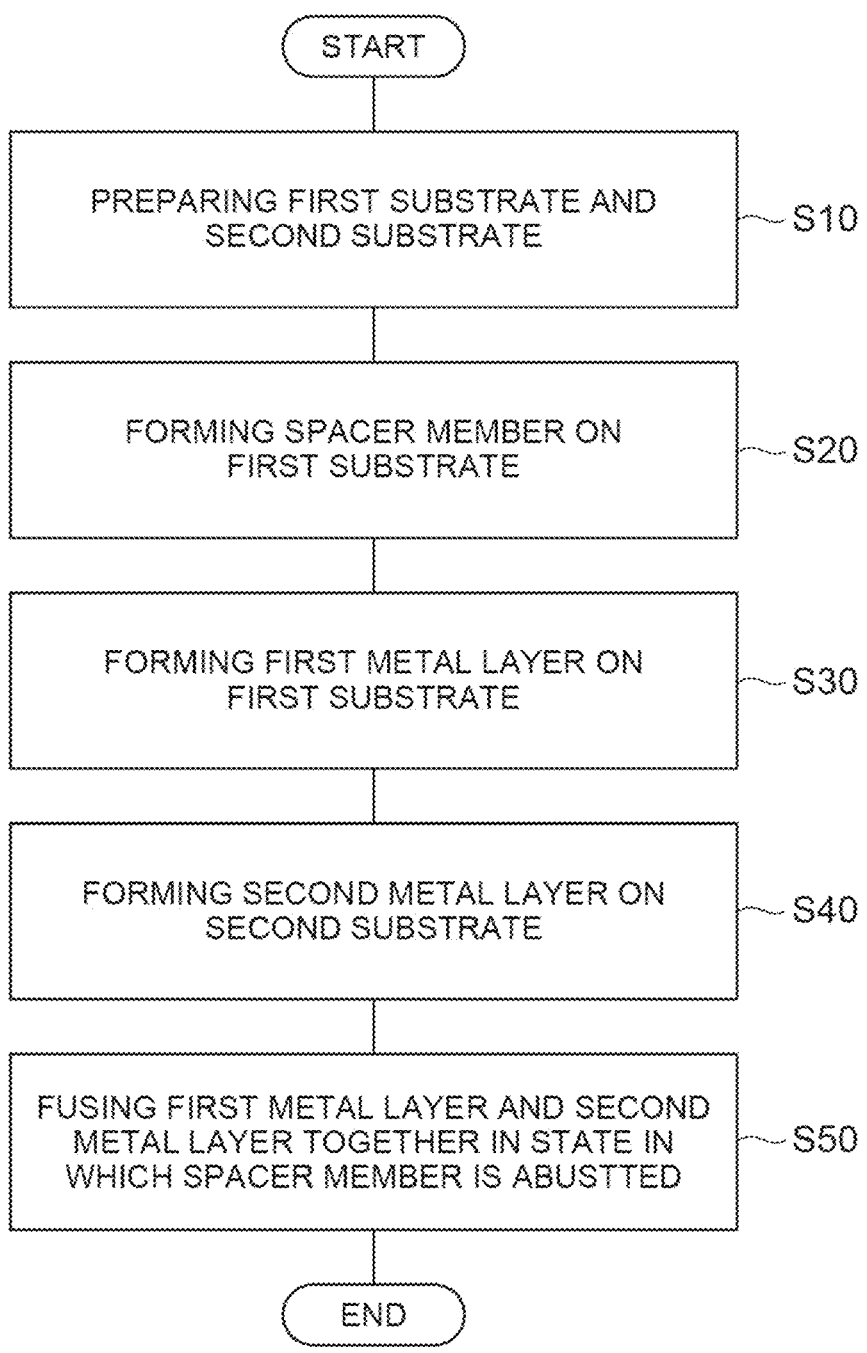
FIG. 3 is a flow chart showing an example of a manufacturing method according to one embodiment.

[Method for manufacturing force sensor] FIG. 3 is a flow chart showing an example of a manufacturing method according to one embodiment. In the manufacturing method M1, first, the lower substrate 10 having the metal array 11 and the upper substrate 20 having the metal layer 21 are prepared (S10).

Figure 4:
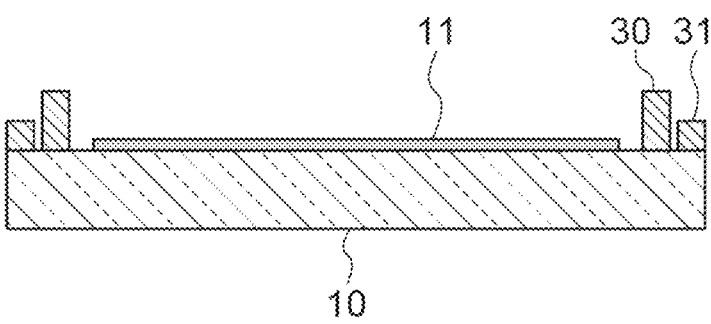
FIG. 4 is a cross-sectional view for explaining the manufacturing method according to one embodiment.

Next, the spacer member 30 is formed on the upper surface of the lower substrate 10 (S20). FIG. 4 is a cross-sectional view for explaining the manufacturing method according to one embodiment. As shown in FIG. 4, the spacer member 30 is formed around the metal array 11 on the upper surface of the lower substrate 10. The spacer member 30 is provided to surround a region in which the metal array 11 is formed. The spacer member 30 is separated from the metal array 11 (see FIG. 2). The spacer member 30 is formed to be thicker than the metal array 11. As an example, a thickness of the metal array 11 is 25 nm and a thickness of the spacer member 30 is 30 nm. The spacer member 30 is formed by photolithography after being deposited by sputtering. The spacer member 30 may be deposited by thermal evaporation or electron beam evaporation.

Next, the first metal layer 31 is formed on the upper surface of the lower substrate 10 (S30). As shown in FIG. 4, the first metal layer 31 is formed around the spacer member 30 on the upper surface of the lower substrate 10. The first metal layer 31 is provided to surround the spacer member 30. The first metal layer 31 is separated from the spacer member 30 (see FIG. 2). The first metal layer 31 is formed to be thinner than the spacer member 30. A thickness of the first metal layer 31 is set such that a sum of the thickness and a thickness of the second metal layer 32, which will be described later, is substantially the same as the thickness of the spacer member 30. The phrase "substantially the same" means that an error of several nanometers is allowed. In a case in which the thickness of the spacer member 30 is 30 nm, the thickness of the first metal layer 31 is arbitrarily set within a range of 1 nm to 29 nm, for example. As an example, the thickness of the first metal layer 31 is set to 15 nm, which is half the thickness of the spacer member 30. The first metal layer 31 is formed by photolithography after being deposited by sputtering. The first metal layer 31 may be deposited by thermal evaporation or electron beam evaporation.

Figure 5:
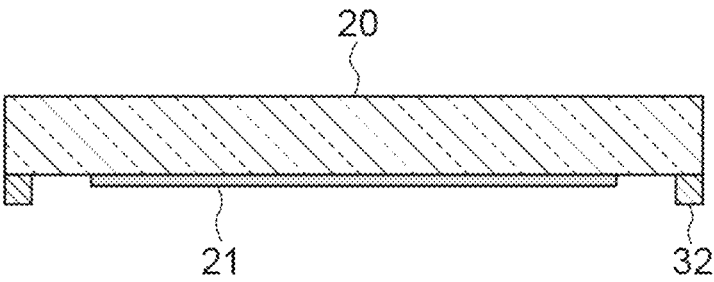
FIG. 5 is a cross-sectional view for explaining the manufacturing method according to one embodiment.

Next, the second metal layer 32 is formed on the lower surface of the upper substrate 20 (S40). FIG. 5 is a cross-sectional view for explaining the manufacturing method according to one embodiment. As shown in FIG. 5, a second metal layer 32 is formed on the lower surface of the upper substrate 20 in a region corresponding to the first metal layer 31 to surround the metal layer 21. The second metal layer 32 is provided to surround a region in which the metal layer 21 is formed. The second metal layer 32 is separated from the metal layer 21. The second metal layer 32 is formed to be thinner than the spacer member 30. The thickness of the second metal layer 32 is set such that a sum of the thickness and the thickness of the first metal layer 31 is substantially the same as the thickness of the spacer member 30. In a case in which the first metal layer 31 is set to 15 nm, which is half the thickness of the spacer member 30, the second metal layer 32 is set to 15 nm. The second metal layer 32 is formed by photolithography after being deposited by sputtering. The second metal layer 32 may be deposited by thermal evaporation or electron beam evaporation.

Next, the first metal layer 31 of the lower substrate 10 and the second metal layer 32 of the upper substrate 20 are fused together (S50). First, the upper surface of the lower substrate 10 and the lower surface of the upper substrate 20 are disposed to face each other, and thus the upper substrate 20 is overlaid on the lower substrate 10. Thus, the first metal layer 31 of the lower substrate 10 and the second metal layer 32 of the upper substrate 20 are brought into contact with each other, and a tip of the spacer member 30 of the lower substrate 10 abuts the lower surface of the upper substrate 20. A gap corresponding to the thickness of the spacer member 30 is maintained between the lower substrate 10 and the upper substrate 20 by the spacer member 30. In this state, the first metal layer 31 and the second metal layer 32 are fused together. The first metal layer 31 and the second metal layer 32 are fused together by laser welding, for example. The first metal layer 31 and the second metal layer 32 may be fused together by cold bonding or direct bonding. As described above, the force sensor 1 is manufactured. Also, the manufacturing method M1 may include cleaning the metal array 11 before the S50.

[Summary of embodiment] In the manufacturing method M1 of the force sensor 1 according to the present disclosure, by fusing the first metal layer 31 of the lower substrate 10 and the second metal layer 32 of the upper substrate 20 together, the lower substrate 10 and the upper substrate 20 are fixed to each other in a state in which the spacer member of the lower substrate 10 abuts the lower surface of the upper substrate 20. The first metal layer 31 and the second metal layer 32 are fused together, and thus the lower substrate 10 and the upper substrate 20 are more securely fixed than when fixed with a polyimide tape. The spacer member 30 of the lower substrate 10 abuts the lower surface of the upper substrate, and thus the gap between the lower substrate 10 and the upper substrate 20 is kept constant even in a case in which the thicknesses of the first metal layer 31 and the second metal layer 32 vary due to the fusion. Thus, according to the manufacturing method M1, a positional relationship between the lower substrate 10 and the upper substrate 20 can be maintained to make the gap between the lower substrate 10 and the upper substrate 20 constant in an unloaded state.

Moreover, in the force sensor 1, since the first metal layer 31 and the second metal layer 32 are made of the same material, they can be strongly fused together. Thus, according to the manufacturing method M1, the lower substrate 10 and the upper substrate 20 can be more reliably fixed to each other.

Although various exemplary embodiments have been described above, the present disclosure is not limited to the above embodiments, and various omissions, substitutions, and modifications may be made.

[Modified example 1] In the above-described embodiment, the spacer member 30 is formed on the upper surface of the lower substrate 10, but the spacer member 30 may be formed on a bottom surface of the upper substrate 20. In this case, the spacer member 30 is formed around the metal layer 21 on the lower surface of the upper substrate 20 in S20 in FIG. 3. Then, in S50, a lower end of the spacer member 30 of the upper substrate 20 abuts the upper surface of the lower substrate 10. Other steps of the manufacturing method are the same.

[Modified example 2] In the above-described embodiment, the spacer member 30 is formed on the upper surface of the lower substrate 10, but the spacer member 30 may also be formed on the bottom surface of the upper substrate 20. That is, a first spacer member is formed on the upper surface of the lower substrate 10 and a second spacer member is formed on the lower surface of the upper substrate 20. In this case, in S20 in FIG. 3, the first spacer member is formed around the metal array 11 on a lower surface of the lower substrate 10. The second spacer member is formed around the metal layer 21 on an upper surface of the upper substrate 20. Then, in S50, a lower end of the second spacer member of the upper substrate 20 abuts an upper end of the first spacer member of the lower substrate 10. Other steps of the manufacturing method are the same.

Even in a case in which it is manufactured as in Modified example 1 or Modified example 2, the force sensor 1 in which the positional relationship between the lower substrate 10 and the upper substrate 20 can be maintained to make the gap between the lower substrate 10 and the upper substrate 20 constant in the unloaded state can be manufactured.

The force sensor 1 may be used for a pressure sensor, a force gauge, a contact sensor, or the like. In the above embodiment, the spacer member 30 is provided to continuously surround the region in which the metal array 11 is formed, the first metal layer 31 is provided to continuously surround the spacer member 30, and the second metal layer 32 is provided to continuously surround the region in which the metal layer 21 is formed, but they are not limited to being continuous and may be discontinuous.

The force sensor 1 may include a protective layer that covers the surface of the metal array 11. By providing the protective layer, the above-described cleaning can be omitted in a manufacturing process of the force sensor 1. The protective layer is made of quartz, for example. The protective layer protects the metal array 11 from damage, oxidation, or the like. The protective layer may be made of polydimethylsiloxane (PDMS). In this case, the protective layer may fill the gap between the metal layer 21 and the metal array 11. The protective layer made of polydimethylsiloxane is changed by an external force.

The thickness of the spacer member 30 may be 190 nm. The thickness of the metal layer 21 may be 100 nm. The thickness of the metal array 11 may be 30 nm. A thickness of the protective layer made of quartz may be 35 nm. A gap between the metal layer 21 and the protective layer may be 30 nm. A distance between metal layer 21 and metal array 11 may be 65 nm.

REFERENCE SIGNS LIST

1 Force sensor
10 Lower substrate (example of first substrate)
11 Metal array
20 Upper substrate (example of second substrate)
21 Metal layer
30 Spacer member
31 First metal layer
32 Second metal layer

What is claimed is:

1. A method for manufacturing a force sensor comprising:
preparing a first substrate which is made of a material that transmits electromagnetic waves and includes on its surface a metal array arranged in a periodic pattern and a second substrate which includes on its surface a metal layer that reflects electromagnetic waves;
forming a spacer member around the metal array on the surface of the first substrate;
forming a first metal layer thinner than the spacer member around the spacer member on the surface of the first substrate;
forming a second metal layer thinner than the spacer member in a region corresponding to the first metal layer on the second substrate; and fusing the first metal layer and the second metal layer together to fix the first substrate and the second substrate in a state in which the spacer member formed on the surface of the first substrate abuts the surface of the second substrate.

2. The method for manufacturing a force sensor according to claim 1, wherein the first metal layer and the second metal layer are made of the same material.

3. The method for manufacturing a force sensor according to claim 1, wherein the first metal layer is separated from the spacer member.

4. A method for manufacturing a force sensor comprising:
preparing a first substrate which is made of a material that transmits electromagnetic waves and includes on its surface a metal array arranged in a periodic pattern and a second substrate which includes on its surface a metal layer that reflects electromagnetic waves;
forming a spacer member around the metal layer on the surface of the second substrate;
forming a first metal layer thinner than the spacer member around the spacer member on the surface of the second substrate;
forming a second metal layer thinner than the spacer member in a region corresponding to the first metal layer on the first substrate; and
fusing the first metal layer and the second metal layer together to fix the spacer member formed on the surface of the second substrate in a state in which it abuts the surface of the first substrate.

5. The method for manufacturing a force sensor according to claim 4, wherein the first metal layer and the second metal layer are made of the same material.

6. The method for manufacturing a force sensor according to claim 4, wherein the first metal layer is separated from the spacer member.

7. A method for manufacturing a force sensor comprising:
preparing a first substrate which is made of a material that transmits electromagnetic waves and includes on its surface a metal array arranged in a periodic pattern and a second substrate which includes on its surface a metal layer that reflects electromagnetic waves;
forming a first spacer member around the metal array on the surface of the first substrate;
forming a first metal layer around the first spacer member on the surface of the first substrate;
forming a second spacer member in a region corresponding to the first spacer member and around the metal layer on the surface of the second substrate;
forming a second metal layer on the surface of the second substrate in a region corresponding to the first metal layer and around the second spacer member; and
fusing the first metal layer and the second metal layer together to fix the first substrate and the second substrate in a state in which the first spacer member formed on the surface of the first substrate abuts the second spacer member formed on the surface of the second substrate.

8. The method for manufacturing a force sensor according to claim 7, wherein the first metal layer and the second metal layer are made of the same material.

9. The method for manufacturing a force sensor according to claim 7, wherein the first metal layer is separated from the first spacer member and the second metal layer is separated from the second spacer member.

* * * * *